EDWIN A. LINK
*INVENTOR.*

BY
ATTORNEYS

April 30, 1946. E. A. LINK 2,399,365
STAR GLOBE
Filed Feb. 28, 1945 3 Sheets-Sheet 2
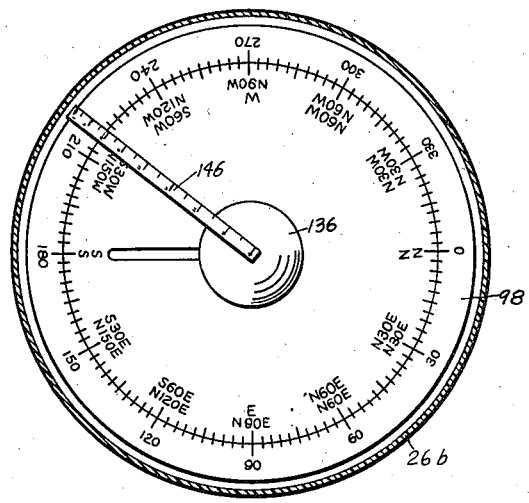
FIG. 4
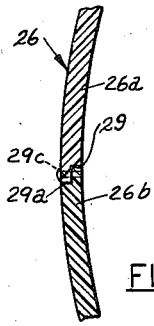
FIG. 1C
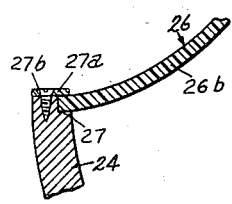
FIG. 1B
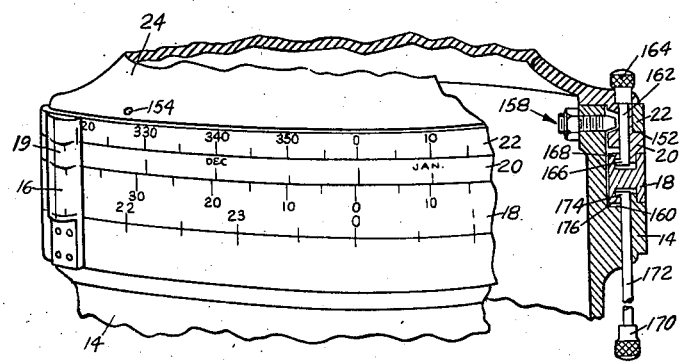
FIG. 6     FIG. 5
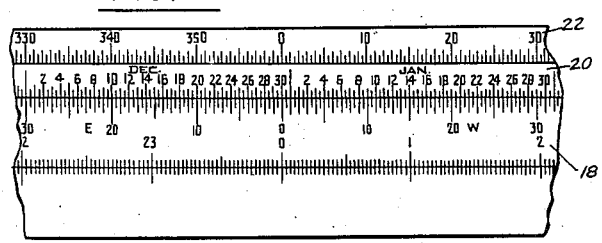
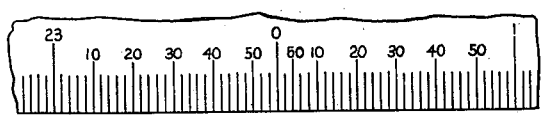
FIG. 7
EDWIN A. LINK
*INVENTOR.*
BY
ATTORNEYS

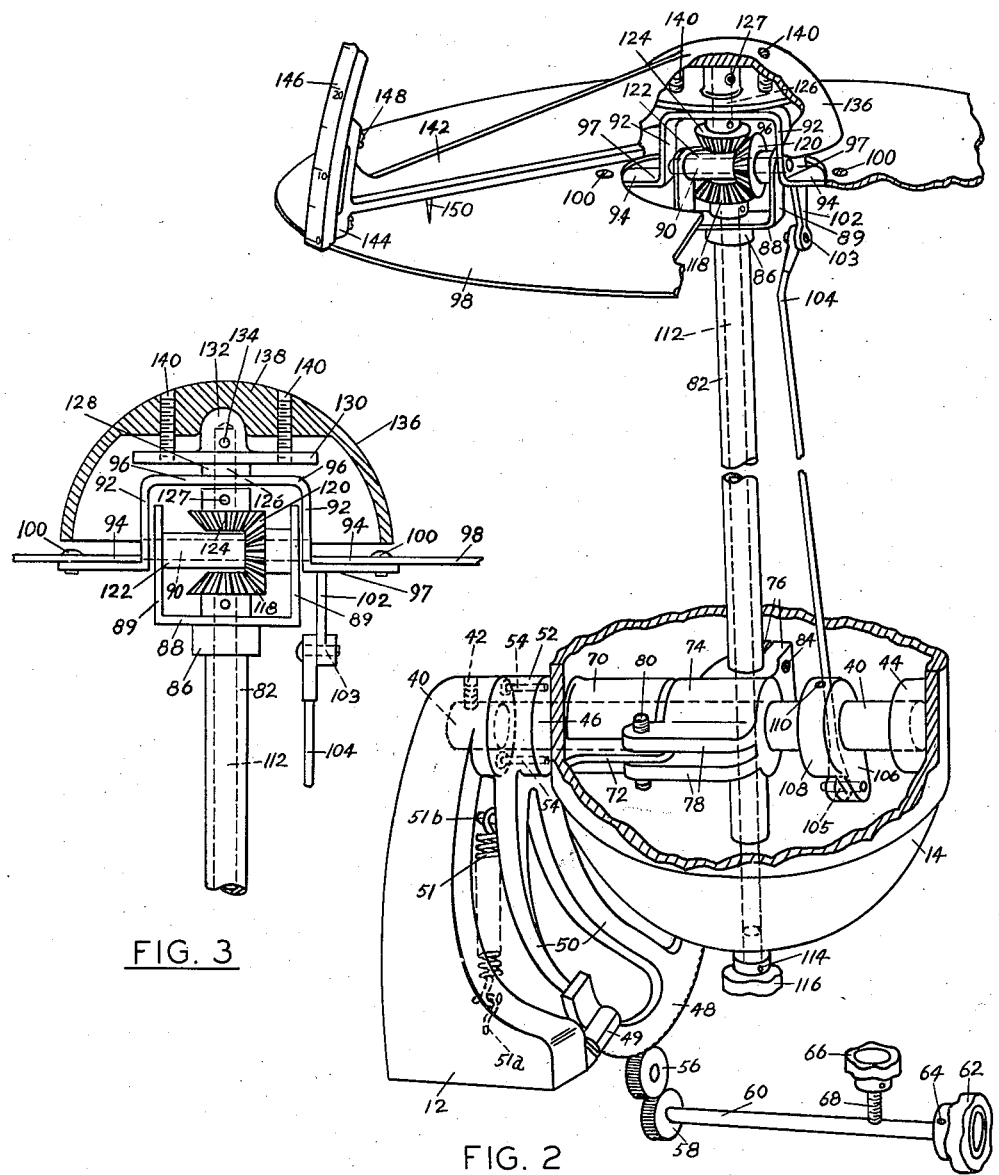

Patented Apr. 30, 1946

2,399,365

UNITED STATES PATENT OFFICE 2,399,365

STAR GLOBE

Edwin A. Link, Binghamton, N. Y.

Application February 28, 1945, Serial No. 580,166

20 Claims. (Cl. 35—47)

My invention relates to a star globe which may be used as a classroom training aid for teaching the principles of elementary astronomy and celestial navigation.

A principal object of my invention is to provide means for making the study of astronomy and celestial navigation easier to be understood by the student, by enabling him to see what factors affect the relative positions between an observer upon the earth's surface and the stars upon the celestial sphere.

More specifically it is an object of my invention to provide a device comprising a large transparent globe upon the surface of which are placed representations of the principal stars of the celestial sphere, the stars being placed relative to one another upon the globe in the same positions that they bear to one another upon the celestial sphere. Inside the globe is a plate representing the observer's horizon and associated with this plate is an arcuate altitude scale which may be used to measure the altitude of any star above the horizon when the globe is positioned relative to the horizon just as the real celestial sphere is positioned relative to the horizon of an observer upon the earth's surface for any given year, month, day, time, longitude and latitude.

Further, it is an object of my invention to provide means whereby the azimuth of any star may be determined when the apparatus is adjusted in accordance with the just mentioned assumed controlling factors.

It is a further object of my invention to provide a device which may be used by experienced navigators in establishing and checking pre-computed lines of position. Other uses of my invention may be found by those skilled in the art, and illustrative uses will be pointed out later.

In order that the nature of my invention may be more clearly understood, reference is made to the accompanying figures which illustrate a preferred embodiment thereof. In the figures, Fig. 1 is a general view of my apparatus, showing the base, main barrel, scales, globe, horizon and altitude scale.

Fig. 1B is a detailed cross sectional view taken along the line 1B—1B of Fig. 1.

Fig. 1C is a detailed cross sectional view taken along the line 1C—1C of Fig. 1.

Fig. 2 is a general detailed view showing the means for rotating about a horizontal axis the barrel and globe to simulate a change in latitude, and also showing the horizon, the altitude scale, as well as many associated features of my invention.

Fig. 3 is a detailed cross sectional view of the horizon and altitude scale positioning means, taken along the line III—III of Fig. 1.

Fig. 4 is a detailed view showing the horizon plate and the azimuth markings thereupon.

Fig. 5 is a detailed view showing the scale locking and unlocking means.

Fig. 6 is a detailed view of the barrel scales and their graduations.

Fig. 7 shows an alternative form of graduations for the time ring.

Figures 1, 1A:
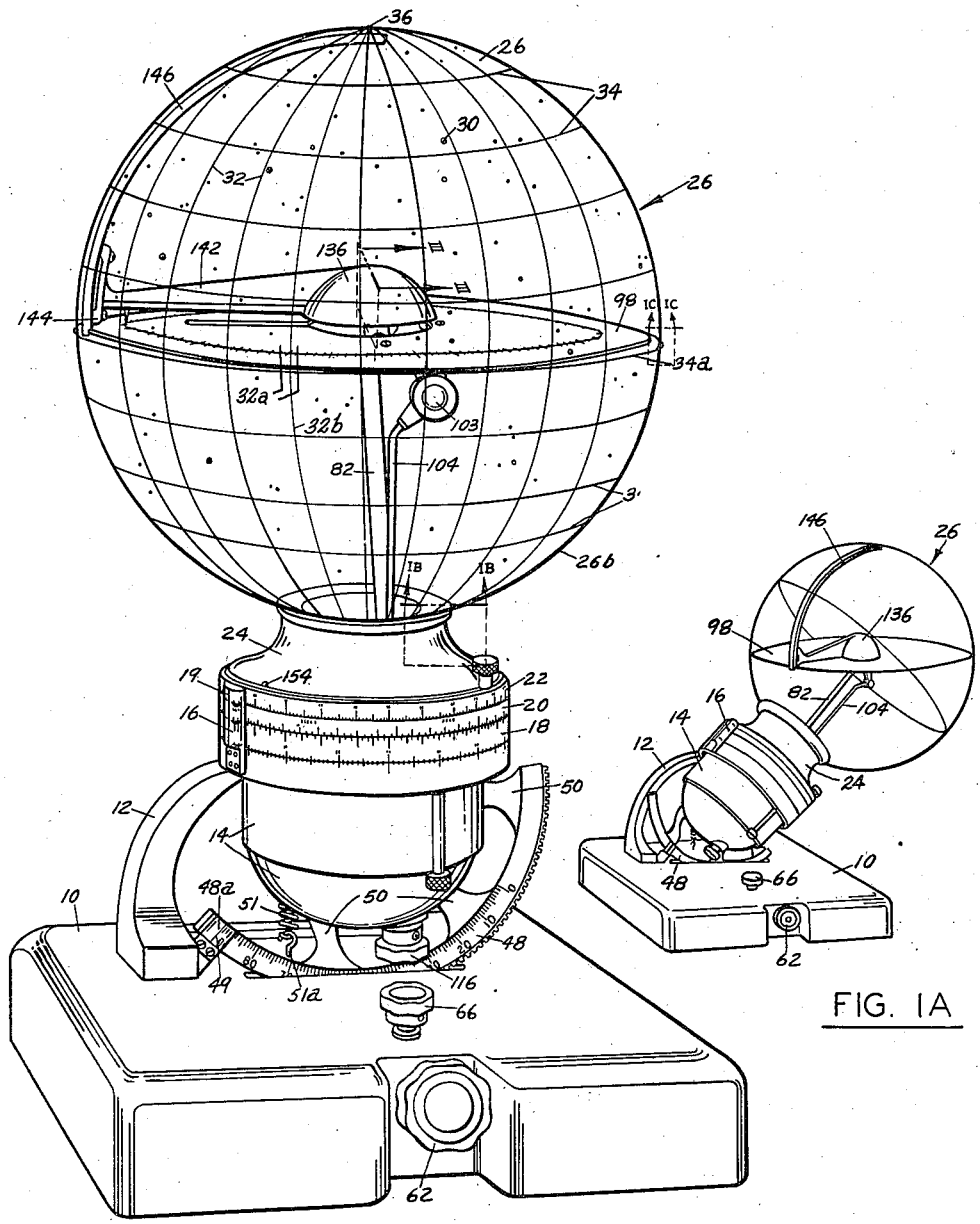
Fig. 1A is a general view of the apparatus of this invention shown in a position to illustrate the operation of the horizon means which forms an important part of my invention.

Reference is now made to Fig. 1 where it will be seen that my improved device comprises a generally square-shaped base 10 which is adapted to set upon a table top or the like. An arcuate bracket 12 has its lower end affixed to base 10 and it is this bracket which holds the barrel-like member 14 around which encircle the scale rings 18, 20 and 22. Globe supporting member 24 is rotatably held by the barrel-like member 14 in a manner which will be later more fully described and affixed to the supporting member 24 is the spherical globe 26. Globe 26, preferably made of a transparent plastic such as lucite, comprises an upper hemispherical member 26a and a lower hemispherical member 26b. Referring to Fig. 1B, the lower member 26b rests upon the top of member 24 which has an annular shoulder 27 adapted to receive the lower lip of member 26b. A ring 27a held by a plurality of screws 27b holds the globe member 26b relative to member 24, and by loosening the screws 27b the globe member 26b may be rotated relative to member 24 for adjusting purposes, as will later be described. As seen in Figs. 1B and 1C, the globe 26 is not a complete sphere, but a circular portion is removed therefrom and the ring 27a fits inside this cut out portion to hold the lower globe member 26b relative to the supporting member 24.

In Fig. 1C it will be seen the lower globe member 26b has an integral extension 29 adapted to fit inside the extension 29a of upper member 26a, and a plurality of screws 29c may be used to hold the members 26a and 26b together. Globe 26 has placed thereupon a plurality of stars 30 all of these stars being placed upon the globe relative to one another just as the real stars which they represent are positioned upon the real celestial sphere relative to one another. On the globe the celestial meridians or hour circles are designated 32, there being eighteen such meridians twenty degrees apart. These hour circles intersect at the point 36 which represents the north celestial pole, while at their lower ends, as seen in Fig. 1, they would intersect, if extended, to form the south celestial pole which would be coincident with the axis of barrel 14. On the globe 26 one of the hour circles 32 has two short lines 32a on either side thereof, and the hour circle 32 between these two lines represents the hour circle through the first point of Aries. This hour circle is designated 32b.

Also on the globe 26 at right angles to the hour circles are the declination circles 34, eight in number and also twenty degrees apart. The middle declination circle is designated 34a and represents the celestial equator.

All of the stars 30 are placed upon the globe 26 relative to the hour circle of Aries 32a and other hour circles 32 as well as the celestial equator 34a and other declination circles 34 according to the hour angle and declination of the star upon the real celestial sphere which they represent.

Referring now to Fig. 2, it will be seen that a fixed shaft 40 is rigidly held by the curved bracket 12 by means of set screw 42. The barrel 14 has an integral interior boss 44 rotatably mounted upon the right end of fixed shaft 40. Also integral with barrel 14 is the boss 46 which is upon the outside of the barrel and positioned across the barrel from the interior integral boss 44. A ninety degree gear sector 48 integral with the three curved, radially extending arms 50 is provided, these three arms converging and being integral with the hub 52 which is rotatably mounted upon the fixed shaft 40. A pair of pins 54 affix the hub 52 to the outer boss 46 and therefore it will be appreciated that the barrel 14 rotates about the fixed shaft 40 in accordance with movements imparted to the gear sector 48, arms 50 and hub 52. It will be seen in Fig. 1 that the gear sector 48 is graduated from zero through ninety degrees, and by means of the fixed magnifying member 48a and index line 49 the position of barrel 14 about shaft 40 may be ascertained, this position being varied according to latitude.

Meshing with the gear sector 48 is the idler gear 56 which is suitably rotatably carried by a shaft (not shown) fixed to the base 10. Driving the idler gear 56 is the spur gear 58 rigidly affixed upon the left end of a horizontal shaft 60 rotatably mounted in the base 10, while upon the right end of shaft 60 is affixed the control knob 62 by means of set screw 64.

By virtue of this arrangement it will be appreciated that the instructor, by means of knob 62, may position the barrel 14 about the fixed shaft 40 at any position within the limits of the apparatus. Inasmuch as the gear sector 48 is ninety degrees in length, the barrel 14 may be rotated through ninety degrees. Thus, the vertical axis of barrel 14 may occupy any position from the vertical, clockwise as seen in Fig. 1 to the horizontal.

The spring 51 having its lower end held by the eye 51a and its upper end by the stud 51b counterbalances the movements of the globe 26 as the axis of barrel 14 moves from the vertical toward the horizontal.

Knob 66 to which the screw 68 is attached may be used by the instructor to lock the shaft 60 against rotation so that the vertical axis of barrel 14 may be fixed against rotation around the axis of shaft 40. The vertical axis of barrel 14 coincides with the north celestial pole 36 and assumed south celestial pole.

Still referring to Fig. 2, it will be seen that the sleeve 70 upon the inside of barrel 14 is cast integrally with barrel 14, shaft 40 passing through this sleeve. Rib 72 is integral with sleeve 70 and a casting 74 also encircling shaft 40 has integral therewith the two jaws numbered 76 and the two ribs 78. The ribs 78 are separated as shown in order that the rib 72 integral with sleeve 70 may be fit therebetween, and the pin 80 connects these ribs so that a rotation of the sleeve 70 with the barrel 14 about fixed shaft 40 will result in a similar rotation of the casting 74. The sleeve 82 passes through a suitable bore in the jaws 76 and the set screw 84 is provided so that these jaws rigidly hold this sleeve.

The sleeve 82 therefore always rotates about the shaft 40 with the barrel 14 and at all times extends generally parallel with the longitudinal axis of this barrel. Affixed upon the upper end, as seen in Fig. 2, of sleeve 82 by means of a suitable set screw (not shown) is the collar 86 which is integral with the yoke 88. As also shown in Fig. 3, the shaft 90 is rotatably mounted in the upper extensions 89 of yoke 88 and affixed upon the outer ends of shaft 90 are the vertical members 92 integral with the horizontal members 94 and 96, the two members 94, the two members 92, and the single member 96 forming an integral supporting member designated generally 97 for the horizon disc 98 which is fixedly attached to the horizontal members 94 by means of screws 100. Integral with the supporting member 97 is the depending arm 102 and the upper end of link 104 is pivotally attached to the lower end of arm 102 by pin 103. The lower end of link 104 is pivotally attached by pin 105 to the arm 106 which is integral with the collar 108 affixed upon stationary shaft 40 by means of pin 110.

By virtue of this arrangement, as the barrel 14 is turned about the shaft 40 by knob 62, the sleeve 82 turns therewith moving the yoke 88, shaft 90, and supporting bracket 97. However, the horizon 98 is always maintained in the horizontal position by the collar 108 which is affixed upon shaft 40, link 104, depending member 102 and bracket 97 which is affixed to horizon 98. In Fig. 1A the horizon 98 is shown to be parallel to the base 10 even though the longitudinal axis of the barrel 14 and the sleeve 82 are angularly inclined relative to the base 10.

Referring now to Fig. 2, it will be seen that inside sleeve 82 and coaxial therewith is the shaft 112 upon the lower end of which is fixedly mounted by means of set screw 114 the control knob 116. Upon the upper end of shaft 112 is affixed the bevel gear 118 arranged to drive the second bevel gear 120 which is affixed upon the sleeve 122 rotatably mounted upon the previously mentioned shaft 90. The bevel gear 124 is arranged to be driven by gear 120, this last bevel gear being affixed by pin 127 upon the lower end of the short shaft 126, better seen in Fig. 3 to which reference is now made. A spacer bearing 128 encircles shaft 126 as shown, the lower surface of bearing 128 contacting the upper surface of the horizontal member 96. Resting upon the upper surface of bearing 128 is the lower surface of the plate 130 which has formed integrally therewith the bell-shaped member 132. The bell-shaped member 132 is drilled as shown for the reception of the upper end of the shaft 126 and pin 134 affixes the bell-shaped member 132 and plate 130 to the shaft 126. The hemispherical housing 136 has a thick upper portion 138 formed complementary to the bell-shaped member 132 so that the housing 136 rests upon this bell-shaped member. Three set screws 140 pass through the portion 138 of housing 136 and enter the plate 130 which is tapped to coact with these screws.

As best seen in Fig. 2, integral with the housing 136 is the horizontal radially extending arm 142 having an enlarged end 144 to which the circular altitude scale 146 is attached by means of screws 148. This altitude scale is a 90 degree arc, as seen in Fig. 1, and is graduated every thirty minutes and labelled every five degrees from zero through ninety, the zero end of the scale being at the lower end. A pointer 150 is affixed to arm 142 below the center-line of this arm for movement therewith.

By virtue of the just described arrangement it will be appreciated that a rotation of the control knob 116 results in a rotation of the upper bevel gear 124. Shaft 126 is thus rotated as is the bell-shaped member 132 and plate 130. By means of the set screws 140 the housing 136 is rotated as is the arm 142, pointer 150, and the altitude scale 146. It has been previously explained that the horizon 98 is at all times positioned in a horizontal plane regardless of the angular position of the barrel 14 and sleeve 82, because the link 104 by means of the arm 102 at all times keeps the arms 94 of bracket 97 horizontal. Similarly the portion 96 of bracket 97 at all times remains horizontal and by means of bearing 128 the plate 130 is also maintained horizontal. Consequently the housing 136 does not tilt whenever the barrel 14 is moved about the axis of the fixed shaft 40 and the arm 142 integral with housing 136 at all times remains in the horizontal plane. Thus the zero mark on the altitude scale 146 always lies in the plane of the top of the horizon 98. The three set screws 140 may be used for adjusting the position of the altitude scale 146.

Reference is now made to Fig. 5 where a portion of the barrel 14 and a portion of the globe supporting member 24 are shown. A counterbore 152 extending completely around the member 24 is provided in the face of the member 24, and placed in this counterbore is the circular hour angle of Aries scale 22 which has been previously mentioned. Integral with the member 24 is the date scale 20 which is immediately below the hour angle of Aries scale 22. It will therefore be appreciated that relative rotation is possible between the hour angle scale 22 and date scale 20. But as seen in Fig. 5 the set screw 154 is held by the shoulder of the member 24, the lower end of this set screw engaging the upper surface of the scale 22. Therefore by means of this set screw relative rotation between the rotatable scale 22 and scale 20 which is integral with member 24 may be prevented. As will later appear, the hour angle scale 22 and the date scale 20 normally rotate together and with the globe supporting member 24.

Also seen in Fig. 5 is the upper portion of the barrel 14, this barrel having an upward integral extension 156 of reduced diameter so that it may fit inside the portion of member 24 forming the date scale 20. A plurality of set screws and lock nuts designated generally 158, the outer ends of the set screws acting as cams, are provided to properly axially position members 14 and 24 and at the same time to prevent relative axial separation of these two members. It will be appreciated that the barrel 14 cannot rotate about its longitudinal axis because it is mounted upon the fixed shaft 40, but from Fig. 5 it will be appreciated that the globe 26 and globe supporting member 24 may be rotated with respect to the barrel 14. A suitable counterbore 160 is provided in the barrel 14 for the reception of the longitude and time scale 18. It will be appreciated that the longitude and time scale 18 is free to rotate indefinitely either way with respect to the barrel 14 and globe supporting member 24.

In Fig. 5 it will be seen that the vertical pin 162 having upon its upper end the knurled thumb head 164 passes downwardly through the globe supporting member 24 inside the hour angle scale 22. Upon the lower end of the pin 162 is the eccentric 166. Thumb screw 164 may be rotated by the instructor so that the eccentric 166 integral with the lower end of the pin 162 engages the L-shaped portion 168 of the longitude and time scale 18 to prevent relative rotation between the scale 18 and the globe supporting member 24.

A second thumb screw 170 affixed upon the lower end of the vertical pin 172 which passes through the member 14 as shown is also provided. Upon the upper end of this pin 172 is the eccentric 174 adapted to engage the L-shaped portion 176 integral with the longitude and time ring 18. By means of the thumb screw 170 the instructor may therefore prevent relative rotation between the longitude and time scale 18 and the barrel 14.

When the set screws 27b shown in Fig. 1B are loosened, the globe 26 may be rotated relative to the supporting member 24. In Fig. 5, when the set screw 154 is loosened, the hour angle scale 22 may be rotated relative to the globe supporting member 24 and to the date scale 20 which is integral with member 24. However, as will later appear, these two adjustments need be made but once a year. Upon tightening of the set screw 154, the globe 26, globe supporting member 24, hour angle scale 22 and date scale 20 always rotate as a unit.

Assuming that the knurled knob 170 is positioned so that the cam 174 upon the upper end of pin 172 engages the L-shaped extension 176 of the longitude-time ring 18, it will be appreciated that the longitude-time ring 18 is held fixed relative to the non-rotatable barrel 14. If at the same time the knurled knob 164 is positioned so that the cam 166 upon the lower end of pin 162 engages the L-shaped extension 168 of the longitude-time ring 18, it will be appreciated that the date scale 20, hour angle scale 22, globe supporting member 24 and globe 26 cannot rotate relative to the longitude-time scale 18 and barrel 14. Thus when both of the knurled knobs 164 and 170 are placed in the locking position, the three scales 22, 20 and 18 are locked against rotation as are the globe supporting member 24 and globe 26.

Assuming that the lower knurled knob 170 is maintained in the locking position and the upper knurled knob 164 is moved so that the cam 166 becomes disengaged from the L-shaped extension 168 of the longitude-time ring 18, it will be appreciated that the date scale 20, hour angle scale 22, globe supporting member 24 and globe 26 may be rotated as a unit relative to the longitude-time scale 18 and barrel 14.

If the upper knurled knob 164 is placed in the locking position and the lower knurled knob 170 is moved so that the cam 174 becomes disengaged from the L-shaped extension 176, it will be appreciated that the longitude-time scale 18, date scale 20 and the hour angle scale 22 as well as the globe supporting member 24 and globe 26 may be rotated as a unit relative to the barrel 14.

Further assuming that both of the knurled knobs 164 and 170 are moved out of the locking position, the longitude-time scale 18 may be rotated by itself relative to the barrel 14 and to the date scale 20, hour angle scale 22 and globe supporting member 24.

Reference is now made to Fig. 6 which shows in detail the markings upon the scales 18, 20 and 22. In Fig. 6 it will be seen that the ring 18 which bears the longitude and time scales, has graduations both for longitude and time. The lower part of the ring 18 bears the time graduations and, as seen in Fig. 6, the lower part of this scale is graduated through 360 degrees in hours and two minute intervals from zero through 24 hours.

The upper portion of the ring 18 carries the longitude graduations and it will be seen that these graduations extend from zero to 180 in both directions, east and west. Every 10 degrees to either side of the zero mark is numbered while each of the 10 degree intervals is graduated for every 30 minutes of arc.

Still referring to Fig. 6, it will be seen that the date scale 20 is graduated in months and days of the month, labelled every second day, each graduation representing a 12 hour interval of mean solar time. The month of February is allotted 28 days only.

It will be seen that the hour angle of Aries scale 22 is graduated from zero through 360 degrees and labelled every 10 degrees—each 10 degree interval in turn being graduated for each 30 minutes of arc.

Referring to Fig. 1, affixed upon the upper rim of the barrel 14 by screws 15 is the magnifying member 16 which may be a Lucite "half round." Carried by member 16 is the index line 19 which is always parallel to the graduations upon the scales seen in Fig. 6.

Referring to Fig. 4 which is a detailed disclosure of the horizon 98, it will be seen that the upper surface of the horizon plate has three rows of figures scribed on the plate to represent three different ways of naming the azimuth of the stars 30 upon the globe 26. The outer row of graduations are from zero degrees clockwise through 360 degrees and represent what is commonly referred to in astronomy and celestial navigation as "true azimuth." The middle row of figures represents azimuth as it is named when using the United States Hydrographic Office Tables "Ho 214" or "Ho 218," that is, from north 180 degrees through east and from north 180 degrees through west. The inner circle of numbers is provided for designating azimuth from north to 90 degrees east; north to 90 degrees west; south to 90 degrees east; and south to 90 degrees west.

Referring to Fig. 2, it will now be appreciated that the azimuth pointer 150 may be used in conjunction with these graduations upon the horizon 98 to indicate the azimuth of any star 30 upon the globe 26 in terms of either of the three just mentioned systems of designation. It has been explained that the altitude scale 146 may be used to measure the altitude of any of the stars 30 above the horizon 98. The zero or north line on the horizon 98 is always upon the far side of the horizon and exactly opposite the index line 19, positioned as seen in Fig. 1.

Those skilled in the art of astronomy and celestial navigation will appreciate that the factors of the year, day of the year, time of the day, latitude and longitude of an observer upon the surface of the earth determine the positions of the stars in the heavens upon the celestial sphere relative to the observer upon the earth.

The above described apparatus of my invention may be used to position the simulated celestial sphere 26 and stars 30 relative to the horizon 98 just as the real celestial sphere and stars are positioned relative to an observer upon the surface of the earth at any time. However, first it is necessary to adjust my apparatus for the calendar year in which the demonstrations fall. This basic yearly adjustment will first be explained.

It is well known in astronomy or celestial navigation that in spite of the fact that the local hour angle of Aries is zero degrees at least once every day in the year for any point upon the earth's surface, there is one day in the year during which the local hour angle of Aries is closest to zero at midnight for any given point upon the earth's surface. In the year 1944 for Greenwich, England, at midnight, September 21, the local hour angle of Aries is 359 degrees 45 minutes. Assuming that it is desired to give demonstrations within the year 1944 and after February 29 (1944 being a leap year), the upper scale lock 164 is loosened and the globe 26, member 24, Aries scale 22 and date scale 20 are rotated until the September 21 graduation appears under the index line 19. Lock 164 is then tightened. Then set screw 154 is loosened and the Aries scale 22 is rotated until the 359 degrees 45 minute point appears under the index line 19 and opposite the September 21 graduation upon the date scale 20. (The September 21 graduation represents 00 hours 00 minutes on September 21.) Set screw 154 is tightened.

Next, in order that the Aries hour circle 32b will be opposite the zero graduation on the Aries scale, the screws 27b shown in Fig. 1B are loosened (first removing the upper part 26a of the globe 26) and the globe portion 26b is rotated until the lower portion of the Aries hour circle 32b is exactly opposite the zero point on the Aries scale.

The upper portion 26a of the globe 26b may then be replaced. As a check of the accuracy of this yearly adjustment, the Aries hour angle scale and globe 26 may be rotated until the zero point on Aries scale is under index line 19. The Aries hour circle 32b should be opposite the north and south graduations on the horizon plate 98. Another method of checking the accuracy of this adjustment is to then rotate the apparatus into the zero degree latitude position and see whether the hour circle 32 ninety degrees from the Aries hour circle 32b coincides with the upper surface of the horizon 98.

These adjustments having been made, any situation for the calendar year 1944 after February 29, 1944, may be demonstrated without disturbing the relative positions of the Aries hour circle 32a, the zero graduation on the Aries hour angle scale 22 and the September 21 graduation on the date scale 20. Having thus positioned these parts the globe 26 and all of the hour circles 32 thereon are properly positioned relative to the Aries hour angle scale 22, and the Aries hour angle scale 22 is properly positioned relative to the date scale 20 so that by viewing the position of any of the graduations on the date scale 20 relative to the Aries scale 22 the hour angle of Aries upon midnight of any day between March 1, 1944, and December 31, 1944, may be ascertained. For any day between January 1 and March 1 during leap years, in order to make this adjustment a day such as February 1, 1944, may be selected. The zero graduation on the time and longitude scale 18 is set under the index 19. The February 1 graduation is set under the index mark. The hour angle Aries scale 22 is adjusted, as described above, to agree with the value for Greenwich hour angle of Aries on 00 hours February 1 as obtained from an air or nautical almanac. Globe 26 is rotated relative to the Aries scale 22 so that the Aries hour circle 32b lines up with the zero mark on the Aries scale.

For February 29 the March 1 graduation is used. For years having but 365 days this basic adjustment need be made but once, selecting the day in September as the basis for adjustments.

The basic adjustment having been made, let us assume that the instructor desires to demonstrate to the students the stars which will be visible upon March 22, 1944, at the Greenwich civil time (GCT) of 12 hours, 03 minutes, 40 seconds, when the observer is stationed at a longitude of 30 degrees west and a latitude of 40 degrees north. First, the instructor moves both of the knurled knobs 164 and 170 to the unlocked position and the longitude-time ring 18 is moved so that by reference to the index line 19 and to the longitude scale, the indicated longitude is 30 degrees west. The lower knob 170 is then placed in the locked position. Second, the globe supporting member 24, globe 26, local hour angle of Aries scale 22 and date scale 20 are rotated as a unit so that the index mark 19 is placed half way between the March 22 and March 23 points on the date scale 20. (Interpolation for fractions of a day past 00 hours is necessary because the time scale 18 is graduated into 24 civil hours. A rotation of the globe 26 through 24 civil hours as determined by reference to the time scale 18 would be a rotation of exactly 360 degrees. However, in twenty-four hours of mean solar time the real celestial sphere apparently rotates through 360 degrees 59 minutes, or through 366 revolutions in a solar year. Thus the interpolation upon the date scale 20 is necessary to account for the discrepancy between the length of a solar day and a sidereal day, or parts thereof.) Then the upper knurled knob 164 is placed into the locked position while the lower knurled knob 170 is loosened. The globe 26, globe supporting member 24 and scales 22, 20 and 18 are then rotated so that the index mark 19 is opposite the 00 hours, 03 minutes and 40 seconds position upon the time scale 18. (The 40 seconds must be set in by interpolation.) Knurled knob 170 is then placed in the locked position. The control knob 66 is then turned so that the set screw 68 becomes disengaged from the shaft 60 and the latitude control knob 62 is rotated until the 42 degree graduation upon the latitude scale 48 is opposite the index mark 49. The barrel 14, globe 26 and horizon 98 will then be positioned approximately as shown in Fig. 1A and the scales will be positioned to show the local hour angle of Aries under the index 19. All of the stars upon the globe 26 above the horizon plate 98 would be visible to an observer under the assumed stated conditions.

If it is desired to demonstrate to the students the altitude of any star under the assumed conditions, by means of the control knob 116, the altitude scale 146 is rotated until the centerline of the scale 146 is directly below the star in question, as shown upon the globe 26. By means of a suitable magnifying glass, if found necessary, the altitude of the star may be ascertained by reference to altitude scale 146.

In order to ascertain the azimuth of a star under the assumed conditions, it is merely necessary to note the position of the azimuth pointer 150 relative to the azimuth scales upon the horizon 98 as shown in Fig. 4.

Assuming, with the globe set as shown in Fig. 1A, the instructor desired to illustrate to the students the apparent rotation of the celestial sphere about an observer upon the earth's surface caused by a passage of time (actually caused by a rotation of the earth about its axes), the knurled knob 170 is placed in the unlocked position and the globe 26, globe supporting member 24, hour angle scale 22, date scale 20 and the time-longitude scale 18 are all turned from right to left as seen in Fig. 1A. The stars will be seen to rise in the east and set in the west, following the same path across the sky as seen by an observer at 42 degrees latitude.

In the event the instructor desires to demonstrate to the students the apparent movements of the stars as a result of a change in the longitudinal position of an observer upon the earth, the knurled knobs 164 and 170 are in the same position that they are in when it is desired to demonstrate the apparent movements as a result of the rotation of the earth upon its axis. If it is assumed that the observer is traveling from east to west, the globe 26, globe supporting member 24, hour angle scale 22, date scale 20 and longitude-time scale 18 are rotated in the direction to indicate an increased west longitude or a decreased east longitude. The stars will then be seen to rise in the west and set in the east. (Such would be the actual case if one could travel westwardly sufficiently fast.) If, on the other hand, it is assumed that the observer is traveling from west to east, the globe is rotated in the opposite direction and the stars will be seen to rise in the east and set in the west.

It will be appreciated that the differential movement of the stars as the result of a passage of time combined with a change in longitudinal position may be demonstrated by rotating the globe for the assumed passage of time and by later rotating the globe in the correct direction according to the assumed direction of change of longitude and the amount of change in the longitudinal position.

If it is desired to show the apparent movement of the stars relative to an observer upon the earth as a change in his latitudinal position, this may be accomplished by releasing the control knob 66 and by properly rotating the latitude control knob 62. In Fig. 1 the stars are positioned relative to the horizon 28 as they would appear to an observer at the north pole. It will be noticed that the north celestial pole 36 is directly above the center of the horizon 28 and that the observer can see all of the stars in the northern celestial hemisphere. Polaris or the north star upon the globe 26 will be seen to be approximately directly overhead with an altitude of approximately 90 degrees. With the globe in this position it can be demonstrated that with a passage of time none of the stars rise and set and consequently that their altitude is always constant. However, it can be demonstrated that the star's azimuth changes through 360 degrees 59 minutes every 24 hours.

Assuming that the instructor desires to show the students the change in relative positions between the stars and an observer who is changing his latitude upon the earth, the instructor merely releases the control knob 66 and rotates the latitude control knob 62. As seen in Fig. 1, the globe 26 and barrel 14 will rotate clockwise in the direction required to position the globe as shown in Fig. 1A. It can thus be illustrated that the altitude of Polaris decreases one degree for each change in the decrease of the latitude of the observer and that some of the stars pass out of view while others are brought into view.

It has been stated that in using the apparatus of this invention it is necessary to interpolate for fractions of a day past 00 hours GCT when setting the date scale because the date scale is graduated into twenty-four civil hours while actually the real celestial sphere apparently moves about the earth through 360° 59' in twenty-four civil hours. Reference is now made to Fig. 7 where an alternative time scale is shown. It will be seen that this time scale is graduated in hours from zero through twenty-three hours fifty-six minutes. The zero graduation mark may represent either 00 hours 00 minutes or 23 hours 56 minutes. The first mark to the right of the zero mark may represent 00 hours 02 minutes or 23 hours 58 minutes, and the next mark may represent 00 hours 04 minutes or 23 hours 60 minutes.

With the use of this scale, after the index line for a given date upon the date scale 20 has been properly set relative to the index mark 19 for the date being used, the rotation of the globe 26 and time scale shown in Fig. 7 so that the correct time of day is shown upon this time scale relative to the index 19 automatically rotates the globe 26 the correct amount for fractions of the day. Thus, when the graduation for 00 hours on March 22 is set under the index line 19 and the 00 hour graduation is also set under the index line 19, if the globe and time scale being described are rotated so that the time scale reads 12 hours 00 minutes, the globe will have been rotated through 180° 29½ minutes. When the time scale reads 23 hours 56 minutes, the globe will have been rotated through exactly 360°, and when the time scale reads 23 hours 60 minutes (or 24 hours 00 minutes) the globe will have been rotated through exactly 360° 59', which is the angle through which the real celestial sphere apparently rotates in 24 hours mean solar time.

It may be concluded therefore that with my device the relationship between an observer upon the surface of the earth and the stars upon the celestial sphere may be easily taught and the effect upon this relationship of the passage of time and change in the position of the observer upon the earth may be visually demonstrated.

My globe also is adaptable to many other uses. For example, experienced navigators may use the globe for roughly checking precomputed lines of position as well as ascertaining before a flight what stars will be visible at certain times and locations for celestial observations. It may be used by students to check the results of celestial problems worked out mathematically.

Many changes may be made in the disclosed preferred embodiment of my invention without departing from the substance thereof. All such changes and uses not specifically outlined are intended to be covered by the following claims.

I claim:

1. In a device of the character described a transparent globe having an opening therein, said globe being mounted for rotation about a horizontal axis; a horizon member inside said globe; a member located outside said globe; and mechanical connecting means passing through said opening connected to said horizon member and to said member outside said globe for maintaining said horizon member level whenever said globe is rotated about said axis.

2. In a device of the character described a transparent globe having an opening therein, said globe being mounted for rotation about a first axis as well as about an axis at right angles to said first axis; a horizon member inside said globe; a member located outside of said globe; and mechanical connecting means passing through said opening connected to said horizon member and to said member outside said globe for maintaining said horizon member level whenever said globe rotates about either of said axes.

3. In a device of the character described a transparent globe having an opening therein; a horizon member inside said globe; a supporting member for holding said globe; said supporting member being arranged for rotation about an axis outside of said globe; a member located outside said globe; and mechanical connecting means passing through said opening connected to said horizon member and to said member outside said globe for maintaining said horizon member level whenever said supporting member and said globe are rotated about said axis.

4. In a device of the character described a transparent globe having an opening therein; a horizon member inside said globe, said horizon member being graduated in an angular fashion; a pointer inside said globe arranged to cooperate with the graduations on said horizon member; and manually operable means outside said globe connected to said pointer for moving said pointer relative to the graduations.

5. In a device of the character described the combination of a transparent globe having an opening therein; a horizon member inside said globe; an arcuate scale bearing member in said globe; and manually operable means outside said globe connected to said arcuate scale bearing member for moving the same around the center of said horizon member.

6. In a device of the character described the combination of a transparent globe having an opening therein; a horizon member inside said globe, said horizon member being graduated in an angular fashion; an arm inside said globe and arranged for movement over said graduations; an arcuate scale bearing member mounted upon the end of said arm for rotation therewith; and means positioned outside said globe for moving said arm and said arcuate member with respect to said graduations.

7. In a device of the character described the combination of a transparent globe having an opening therein; a horizon member in said globe; an arm pivoted for rotation about an axis through the center of said horizon member and perpendicular thereto; supporting means passing through said opening for supporting said horizon member and said arm inside said globe; and additional supporting means passing through said opening for maintaining said horizon member and said arm level when said globe is rotated about a horizontal axis.

8. A device of the character described comprising a globe having an opening therein; an upper supporting member attached to said globe around the periphery of said opening; a lower supporting member for supporting said upper supporting member, said upper supporting member being rotatably held by said lower supporting member for rotation about an axis; and a base member, said lower supporting member being held by said base member for rotation about an axis perpendicular to said first mentioned axis.

9. A device of the character described comprising a transparent globe having an opening therein; an upper supporting member attached to said globe around the periphery of said opening; a lower supporting member for supporting said upper supporting member, said two supporting members being arranged to permit relative rotation therebetween about an axis; a horizon member within said globe; means passing through said opening for supporting said horizon member in said globe and for preventing rotation of the same when said supporting members are relatively rotated about said axis; and additional means passing through said opening for maintaining said horizon member level when said lower supporting member is rotated about an axis perpendicular to said first axis.

10. A device of the character described comprising in combination a lower supporting member mounted for rotation about a horizontal axis; an upper supporting member carried by said lower supporting member and arranged for rotation with respect to said lower supporting member about about an axis at right angles to said first axis; a transparent globe carried by said upper member for rotation therewith; a horizon member in said globe; supporting means for said horizon member movable with said lower supporting member about the horizontal axis; and additional means movable with a movement of said lower supporting member about the horizontal axis for maintaining said horizon member level when said lower supporting member is rotated about the horizontal axis.

11. In a device of the character described the combination of a transparent globe having an opening therein; a horizon member in said globe; a member passing through said opening for supporting said horizon member; said horizon member being pivotally held by said supporting member for pivoting about a first axis perpendicular to the longitudinal axis of said supporting member; a base member, said supporting member being pivotally held by said base member for pivoting about a second axis perpendicular to its longitudinal axis; a stationary member and means interconnecting said stationary member and said horizon member for causing said horizon member to pivot relative to said supporting member about the first axis when the supporting member is pivoted about the second axis.

12. In a device of the character described the combination of a transparent globe having an opening therein; a horizon member in said globe; an arm pivoted for rotation about an axis perpendicular to the horizon member; an arcuate scale bearing member mounted on the outer end of said arm; a first member for supporting said horizon member, said arm and said scale bearing member; a second member for rotating said arm and said arcuate scale bearing member relative to said horizon member; and a third member for positioning said horizon member relative to the longitudinal axis of said first supporting member.

13. In a device of the character described the combination of a lower supporting member; an upper supporting member arranged to be rotated about an axis with respect to said lower supporting member; a globe held by said upper supporting member; a plurality of graduated circular members encircling said supporting members and arranged to be rotated about said axis; a locking device carried by said lower supporting member and a locking device carried by said upper supporting member, said supporting members, said graduated circular members and said locking devices being arranged so that when both of said locking devices are locked said upper supporting member and all of said graduated circular members are locked against rotation, and when either of said locking devices is unlocked said upper supporting means and at least one of said graduated circular members may be rotated.

14. In a device of the character described the combination of a lower supporting member; an upper supporting member arranged to be rotated about an axis with respect to said lower supporting member; a globe held by said upper supporting member; a first circular member graduated in degrees up to 360; a second circular member graduated in months and days of the year; a third circular member graduated in degrees up to 360 as well as in hours and minutes of the day, all of said circular members being arranged for rotation about the mentioned axis and each of said circular members being adjacent at least one other of said circular members.

15. In a device of the character described the combination of a globe supporting member; a globe adjustably held by said globe supporting member, said globe having thereon at least one line representing an hour circle on the celestial sphere; a first circular member encircling said globe supporting member and being rotatably held by said globe supporting member, said circular member being graduated in degrees up to 360; a second circular member encircling said globe supporting member and being graduated in months and days of the year, said second circular member being adjacent said first circular member; means for locking said globe to said globe supporting member; and means for locking said rotatably held circular member to said globe supporting member.

16. In a device of the character described the combination of a rotatable globe supporting member; a globe held by said globe supporting member to be rotated therewith; a 360 degree circular member encircling said globe supporting member, said circular member being evenly graduated in hours and minutes from 00 hours 00 minutes through 23 hours 56 minutes; an index mark positioned adjacent said circular member; and locking means for selectively locking and unlocking said circular member with respect to said globe supporting member for rotation with said globe supporting member or independently thereof.

17. A device of the character described comprising a base; a shaft held by said base; a manually operable control member; a supporting member held by said shaft and arranged to be rotated about the axis of said shaft upon movement of said control member; a plurality of rotatable circular graduated members encircling said supporting member; and a globe held by said supporting member.

18. A device of the character described comprising a base; a shaft held by said base; a manually operable control member; a supporting member associated with said shaft and arranged to be rotated about the axis of said shaft upon movement of said control member; a transparent globe held by said supporting member, said globe having an opening therein adjacent the supporting member; a rigid horizon member within said globe; a member located outside said globe; and means interconnecting said last mentioned member and said horizon member for maintaining said horizon member level whenever said supporting member and globe are rotated about the axis of said shaft.

19. A device of the character described comprising a base; a shaft held by said base; a supporting member mounted upon said shaft for rotation with respect thereto; a plurality of graduated circular members encircling said supporting member; and a transparent globe positioned above and supported by said supporting member.

20. In a device of the character described the combination of a transparent globe; a supporting member for supporting said globe; a shaft positioned a substantial distance from said globe, said supporting member being arranged for rotation about the axis of said shaft; and a graduated arcuate member near the bottom of said supporting member arranged to indicate the angular position of said supporting member about the axis of said shaft.

EDWIN A. LINK.